US005670261A

United States Patent [19]

Kameya et al.

[11] Patent Number: 5,670,261

[45] Date of Patent: Sep. 23, 1997

[54] COMPOSITE METAL SHEET AND METHOD FOR PRODUCING IT

[75] Inventors: Toru Kameya, Chiba; Katsuaki Takano, Ichikawa, both of Japan

[73] Assignee: Taiyo Steel Co., Ltd., Tokyo, Japan

[21] Appl. No.: 411,882

[22] Filed: Mar. 28, 1995

[30] Foreign Application Priority Data

Aug. 25, 1994 [JP] Japan .................................... 6-222727

[51] Int. Cl.[6] ........................................ B32B 15/08

[52] U.S. Cl. .......................... 428/457; 428/416; 428/626; 427/532; 427/533; 427/327; 427/409

[58] Field of Search .................................... 428/457, 458, 428/421, 422, 332, 339, 920, 921, 335, 626, 623, 416; 427/532, 533, 409; 156/272.6

[56] References Cited

U.S. PATENT DOCUMENTS 4,888,244 12/1989 Masubuchi et al. .................... 428/416

FOREIGN PATENT DOCUMENTS 63-165134 7/1988 Japan .

*Primary Examiner*—John J. Zimmerman

*Attorney, Agent, or Firm*—Wenderoth, Lind & Ponack

[57] ABSTRACT

Disclosed is a composite metal sheet to be produced by chemically treating the surface of a metal substrate, coating and drying an organic resin-based composition thereon to form a undercoat layer, then coating thereon a two-layered resin interlayer composed of an adhesive layer of a modified polyolefin resin and a polyolefin resin layer at a thickness of from 50 to 300 μm, then modifying the surface of said polyolefin resin layer by flame treatment or corona discharging treatment thereby forming functional groups in an amount of from 0.05 to 0.30 in terms of O/C representing the ratio of the amount of oxygens in the functional groups to the amount of carbons on the surface, and finally coating and drying an urethane-curing polyester resin paint or an urethane-curing fluorine resin paint at a thickness of from 8 to 35 μm to form a top coat layer. The composite metal sheet has excellent corrosion resistance, weather resistance and formability.

7 Claims, No Drawings

COMPOSITE METAL SHEET AND METHOD FOR PRODUCING IT

FIELD OF THE INVENTION

The present invention relates to a composite metal sheet having excellent corrosion resistance, weather resistance and formability, which is composed of a metal sheet, such as a zinc-plated steel sheet, an aluminum/zinc alloy-plated steel sheet, an aluminum-plated steel sheet, an aluminum sheet, a stainless steel sheet or the like, coated with a polyolefinic thermoplastic resin and a thermosetting synthetic resin paint, and also to a method for producing such a composite metal sheet.

BACKGROUND OF THE INVENTION

Coated and surface-treated metal sheets which have heretofore been used as outdoor construction materials are produced, in general, by coating various metal sheets, such as zinc melt-plated steel sheets, electrolytic zinc-plated steel sheets, 5% Al/Zn alloy-plated steel sheets, 55% Al/Zn alloy-plated steel sheets, aluminum-plated steel sheets, aluminum sheets, stainless steel sheets, etc., by continuous coating methods, continuous film-laminating method or continuous hot-melt coating methods such as those mentioned below.

(1) According to a continuous coating method, various metal sheets are chemically treated and then various coating materials are continuously coated thereover, using roll coaters, etc., and then dried to produce color metal sheets.

(2) According to a continuous film-laminating method, various metal sheets are chemically treated, then coated with undercoat materials such as adhesives, etc. and dried, and thereafter various resin films are continuously laminated thereover to produce various laminate metal sheets.

(3) According to a continuous hot-melt coating method, the surfaces of various metal sheets are chemically treated, then coated with undercoat compositions and dried, and thereafter continuously coated with an adhesive layer of a modified polyolefin resin and a polyolefin resin layer by co-extruding the both resins from a T-die thereover to produce various resin-coated metal sheets.

Coated and surface-treated metal sheets thus produced by these methods have excellent corrosion resistance, weather resistance and formability and are desirably decorated, and their quality is stabilized. In addition, such coated and surface-treated metal sheets do not need any posterior coating step after machined or constructed. Therefore, the use of these is broadening as materials for outdoor constructions.

The necessary properties of such coated and surface-treated metal sheets to be used as construction materials are high weather resistance, corrosion resistance, formability and scratch resistance. Recently, however, the surroundings for outdoor constructions are being worsened, for example, by acid rain, etc., while, on the other hand, maintenance-free use of outdoor constructions is needed in such severe surroundings. Therefore, coated and surface-treated metal sheets for outdoor constructions are needed to have much more improved properties.

In view of the weather resistance, the practical usefulness of fluorine resin-based coating compositions for maintenance-free outdoor constructions has been verified. Steel sheets coated with a thick polyvinyl chloride film, polyethylenic resin-coated steel sheets, etc. have been used, as having high corrosion resistance.

Steel sheets coated with fluorine resin-based compositions have been verified to have extremely excellent weather resistance when used as outdoor construction materials for a long period of time. In these sheets, however, the thickness of the coated layer is rather small, in general, from 20 to 35 μm or so and the hardness of the coated layer is somewhat low. Therefore, these sheets have a problem in that they are often scratched deeply to the metal substrate when shaped or machined by bending or roll-forming or when constructed so that they are corroded from the scratches.

In order to solve these problems, there has been developed a technique of introducing glass beads into the coated layer to elevated the hardness of the coated layer, thereby improving its scratch resistance and abrasion resistance, while maintaining the advantages of the fluorine resin-based coating compositions. However, since the thickness of the fluorine resin layers coated on steel sheets is ordinary thin, the improvement by the technique is not satisfactory. Therefore, in general, it is necessary to protect the layer by a protective film or to retouch the scratched parts by post-coating after shaped. Thus, the fluorine resin-coated steel sheets, though having excellent weather resistance, have a problem in that they are easily scratched during its forming, or its handling for use.

On the other hand, in polyvinyl chloride-coated steel sheets and polyolefinic resin-coated steel sheets, the thickness of the coated layer is generally from 150 to 300 μm or so. Therefore, even though these sheets are scratched, when machined or constructed, the scratches may be within the coated layers and hardly reach the metal substrate. In addition, since these sheets are machined with ease, the machined parts are not cracked. Therefore, these sheets have excellent corrosion resistance.

However, since the energy for bonding the atoms constituting the molecules in these resins is smaller than that in fluorine resins and is smaller than the energy of sun light, these resins are rapidly deteriorated when used in the outdoors, even though their molecular weights and molecular weight distributions are suitably controlled or even though antioxidants, ultraviolet absorbents, etc. are added thereto. Thus, these resins cannot be said to have sufficient weather resistance.

In addition, since the thickness of the coated layers of these coated steel sheets is thick, their properties as flame-resistant materials are poor. In order to solve this problem, there is known a method of thinning the polyolefin layer, such as that shown in Japanese Patent Publication No. 6-26874. However, this method still has a problem in that the scratch resistance of the thus-thinned layer is lowered.

SUMMARY OF THE INVENTION

The present invention has been made in consideration of the above-mentioned problems. Its object is to provide a composite metal sheet having excellent machinability (formability), weather resistance and corrosion resistance, which could not be obtained by any of continuous coating methods, continuous film-laminating methods and hot-melt coating methods for producing various metal sheets, and also to provide a method for producing such a composite metal sheet.

The present invention is to solve the above-mentioned problems, providing the following:

(1) A composite metal sheet having, on the surface of a metal substrate, a chemical-treated layer as the lowest layer, a primer layer of an organic resin-based paint thereon, a two-layered resin interlayer with a thickness of from 50 to 300 μm composed of an adhesive layer of a modified polyolefin resin and a polyolefin resin layer, the surface of said resin interlayer having been modified to have functional groups thereon in an amount of from 0.05 to 0.30 of O/C representing the ratio of the amount of oxygens in the functional groups to the amount of carbons on the surface, and a top coat layer with a thickness of from 8 to 35 μm made of an urethane-hardening polyester paint or an urethane-hardening fluorine paint, in this order.

(2) A method of producing a composite metal sheet comprising steps of chemically treating the surface of a metal substrate, coating and drying an organic resin-based paint thereon to form a primer layer, then forming thereon a two-layered resin interlayer composed of an adhesive layer of a modified polyolefin resin and a polyolefin resin layer at a thickness of from 50 to 300 μm, then modifying the surface of said polyolefin resin layer by flame treatment or corona discharging treatment thereby forming functional groups thereon in an amount of from 0.05 to 0.30 in terms of O/C representing the ratio of the amount of oxygens in the functional groups to the amount of carbons on the surface, and finally coating and drying an urethane-hardening polyester paint or an urethane-hardening fluorine paint at a thickness of from 8 to 35 μm to form a top coat layer.

DETAILED DESCRIPTION OF THE INVENTION

The present invention will be described in detail hereunder.

The metal substrate to be coated according to the present invention may be any of a zinc-plated steel sheet, an aluminum/zinc alloy-plated steel sheet, an aluminum-plated steel sheet, an aluminum sheet, a stainless steel sheet, etc. The surface of the metal substrate is chemically treated, by which the adhesiveness between the metal substrate and the undercoat layer is improved and, in addition, the corrosion resistance of the composite metal sheet of the invention is improved.

For the chemical conversion treatment, in general, used are phosphoric acid compounds for spraying or dipping treatment or chromic acid compounds for coating treatment. These compounds are suitably selected, depending on the kind of the metal substrate to be treated therewith.

Next, the surface of the thus chemically-treated metal substrate is coated with a primer paint and dried. Where the metal substrate to be coated is a zinc-plated steel sheet, an aluminum/zinc alloy-plated steel sheet, an aluminum-plated steel sheet or an aluminum sheet, strontium chromate or zinc chromate or a mixture of the two may be added as a rust-inhibiting pigment to the undercoat paint in an amount of from 10 to 40 parts by weight to 100 parts by weight of the resin in the composition, by which the corrosion resistance of the composite metal sheet of the invention may be improved further.

If the amount of the rust-inhibiting pigment is less than 10 parts by weight, the corrosion resistance of the composite metal sheet of the invention will be insufficient, but if it is more than 40 parts by weight, the improvement in the corrosion resistance is no more enhanced but the moisture resistance of the undercoat layer will be lowered rather unfavorably. It is recommended that the dry thickness of the undercoat layer is within the range between 1 μm and 20 μm.

Next, a two-layered composite film composed of an adhesive layer of a modified polyolefin resin and a polyolefin resin layer is coated over the surface of the thus-formed undercoat layer by co-extruding hot melts of the two resins from an extruder through its T-die, thus forming the two-layered resin interlayer on the metal sheet by direct coating under pressure, or alternatively, such a two-layered composite film is previously formed and wound up and the film is laminated on the undercoat layer to form the intended resin interlayer thereon.

In this method, the adhesive layer is employed to improve the adhesion between the undercoat layer and the resin interlayer.

In general, a thermal stabilizer and/or an optical stabilizer are/is added to the polyolefin resin layer so as to prevent the layer from being decomposed by oxidation or ultraviolet rays.

According to the present invention, a top coat layer is provided on the coated metal sheet in the manner mentioned hereinafter. Therefore, since the polyolefin resin layer is not directly exposed to oxygen, ultraviolet rays, etc., the addition of such thermal stabilizer and optical stabilizer is not indispensable.

However, it is recommended to add a thermal stabilizer and an optical stabilizer to the resin layer, presuming the probability that the top coat layer will be broken by scratching, etc., when the composite metal sheet of the invention is machined or constructed.

It is recommended that the thickness of the two-layered resin interlayer composed of an adhesive layer of a modified polyolefin resin and a polyolefin resin layer is within the range between 50 μm and 300 μm, but the thickness is more preferably with the range between 80 μm and 300 μm.

The thickness of the adhesive layer of a modified polyolefin resin is preferably within the range between 5 μm and 30 μm. If it is less than 5 μm, the adhesiveness between the undercoat layer and the adhesive layer will be unstable, but if it is more than 30 μm, such does not result in the increase in the adhesiveness of the layer but rather increases the cost of the product.

As the polyolefin resin, preferably used are a polyethylene resin, a polypropylene resin and a mixture of polyethylene and polypropylene resins.

If the thickness of the resin interlayer is less than 50 μm, the severe formability of the composite metal sheet of the invention for embossing it and so on will be poor and the sheet is defective in that the machined area of its coat is often cracked.

The reason why the thickness of the polyolefin resin interlayer is preferably 80 μm or more is because, since polyolefin resins have excellent resistance against water penetration and moisture penetration therethrough, the interlayer is effective in protecting the metal substrate from the outdoor corroding environment when the composite metal sheet of the invention is used in the outdoors. If the thickness of the resin interlayer is less than 80 μm, there will be a great risk of being such that the scratches made on the composite metal sheet product of the invention when the sheet is machined or constructed reach the metal substrate. If so, it will be difficult to expect sufficient corrosion resistance of the composite metal sheet, even though the polyolefin resin layer has excellent resistance against water penetration and moisture penetration therethrough.

On the other hand, even if the thickness of the resin interlayer is more than 300 μm, its characteristic of preventing scratches could not be improved so much but the workability in hot melt extrusion of the resin is rather lowered with the result that the production costs are increased.

When the thickness of the resin interlayer is 100 μm or more, the flame resistance of the composite metal sheet of the invention is lowered. If the sheet is desired to be flame-resistant, antimony trioxide and a bromine-containing flame retardant may be added to the resin interlayer by which the flame resistance of the sheet is improved.

As the bromine-containing flame retardant, typically mentioned are tetrabromobisphenol-A, decabromobisphenyl ether, etc.

As one means to be used for evaluating the flame resistance of resins, there is known an oxygen index. In general, polyolefin resins have an oxygen index of about 18%.

Adding the above-mentioned antimony trioxide and bromine compound to the resin interlayer, it is possible to increase the oxygen index of the resulting interlayer. Elevating its oxygen index more than the oxygen concentration in air, the flame resistance of the resin interlayer can be improved.

It is recommended that the amounts of such antimony trioxide and bromine compound to be added are from 3 to 15 parts by weight each, to 100 parts by weight of the resin.

If the amounts are less than 3 parts by weight, the improvement in the flame resistance of the interlayer will be insufficient. If, however, they are more than 15 parts by weight, the improvement in its flame resistance will no more be enhanced but the formability of the composite metal sheet of the invention will be worsened rather defectively.

After the resin interlayer has been formed, its surface is modified by flame treatment or corona discharging treatment, by which functional groups such as hydroxyl group, carbonyl group, carboxyl group, etc. are formed on the surface of the polyolefin resin layer so that the polarity of the surface is elevated and the adhesiveness between the layer and the top coat layer to be formed thereover is improved.

If the surface of the polyolefin resin layer is not modified, its adhesiveness to the top coat layer to be formed thereover cannot almost be ensured.

The degree of the surface modification of the resin interlayer may be determined by analyzing the oxygen amount (O) and the carbon amount (C) on the modified surface, using ESCA (X-ray Photoelectron Spectroscopy; XPS), followed by obtaining its ratio of O/C.

Precisely, the oxygen amount means the amount of oxygens to be contained in the functional groups formed by the surface modification. With the progress of the surface modification, the oxygen amount is increased, resulting in the increase in the ratio O/C.

The matter to which the inventor has paid the best attention is to specifically determine the O/C value. The reason is because if the adhesiveness of the polyolefin resin layer to the top coat layer is lost while the composite metal sheet is used in the outdoors for a long period of time with the result that the top coat layer is peeled from the underlying polyolefin resin layer, then not only the quality of the sheet but also the commercial value thereof is noticeably damaged.

From the results of various tests which will be mentioned hereinafter, it has been found that the O/C value at which the adhesiveness between the two layers is stabilized is within the range between 0.05 and 0.30 just before coating the top coat layer over the polyolefin resin layer.

If the O/C value is less than 0.05, the amount of the functional groups on the surface of the polyolefin resin layer is smaller than the necessary one, so that the adhesiveness between the polyolefin resin layer and the top coat layer thereon cannot be ensured satisfactorily.

On the other hand, even if the O/C value is more than 0.30, the adhesiveness between them is no more improved but is rather lowered due to the increase in unstable functional groups on the resin layer.

Selection of the kind of the coating composition to be used for coating the top coat layer is extremely important in the present invention.

The top coat layer must be such that it is stable and durable for a long period of time when the composite metal sheet of the invention is used in the outdoors and, additionally, it reacts with the functional groups existing on the surface of the polyolefin resin layer thereby improving its adhesiveness to the underlying resin interlayer.

After having tested various coating compositions, it has been found that polyester resin paints and fluorine resin paints of fluoro-olefin vinyl ether polymers, containing isocyanates as the crosslinking agent, are preferred.

For instance, when melamine-curing polyester resin compositions and vinylidene fluoride-based fluorine resin compositions containing thermoplastic acrylic resins as the binder are used to form the top coat layer, the primary adhesiveness of the top coat layer formed to the underlying rein interlayer may be obtained but its adhesiveness is noticeably lowered after the composite metal sheet is kept wet for a long period of time.

Therefore, in order to ensure the stable adhesiveness between the top coat layer and the underlying resin interlayer while the composite metal sheet is used in the outdoors for a long period of time, the coating composition for the top coat layer must contain an isocyanate compound as the crosslinking agent.

It is recommended that the amount of the isocyanate compound to be used as the crosslinking agent is from 15 to 55 parts by weight to 100 parts by weight of the resin in the coating composition (paint).

If the amount of the isocyanate compound is less than 15 parts by weight, the hardness of the top coat layer itself will be low and a suitable top coat layer cannot be formed.

If, on the other hand, the amount of the isocyanate compound is more than 55 parts by weight, the top coat layer to be formed will be too hard so that its formability is worsened, thereby causing some problems in shaping and machining the composite metal sheet.

It is recommended that the thickness of the top coat layer is within the range between 8 μm and 35 μm. If the thickness of the top coat layer is less than 8 μm, ultraviolet rays will pass through the top coat layer while the composite metal sheet is used in the outdoors, thereby deteriorating the resin interlayer. As a result, there will be an unfavorable probability that the adhesiveness between the resin interlayer and the top coat layer is lowered.

On the other hand, even if the thickness is more than 35 μm, such a thick top coat layer will no more be effective in improving the corrosion resistance, the weather resistance and the formability of the composite metal sheet but will rather increase the production costs.

As mentioned above, antimony trioxide and a bromine compound may be added to the resin interlayer so as to improve the flame resistance of the interlayer. Like this, antimony trioxide and a bromine compound may also be added to the top coat layer, thereby further improving the flame resistance of the composite metal sheet.

It is also recommended, like the resin interlayer, that the amounts of the antimony trioxide and the bromine compound to be added to the top coat layer are from 3 to 15 parts by weight each, to 100 parts by weight of the resin in the layer.

If the amounts are less than 3 parts by weight, the improvement in the flame resistance of the top coat layer will be insufficient. If, however, they are more than 15 parts by weight, the improvement in its flame resistance will no more be enhanced but the formability of the composite metal sheet of the invention will be worsened rather defectively.

If desired, a silver-containing, inorganic anti-microbial agent may be added to the top coat layer, thereby making it resistant to microbes and fungi (mold).

As the silver-containing, inorganic anti-microbial agent usable for this purpose, for example, mentioned are titanium phosphate-zinc oxide-silver, zeolite-silver, apatite-silver, zirconium phosphate-silver, Apacider A of a sintered product composed of calcium phosphate and a silver compound (produced by Sangi Co.), Clean P-2-D consisting essentially of $SiO_2.Al_2O_3.ZnO.Li_2O.Ag$ (produced by Nichihan Laboratories Co.), etc.

Such a microbicide is added to the top coat layer in an amount of from 0.05 to 2 parts by weight to 100 parts by weight of the top-coating resin. If its amount is less than 0.05 parts by weight, the anti-bacterial and anti-fungal property of the layer will be low. However, even if its amount is more than 2 parts by weight, the anti-bacterial and anti-fungal property of the layer will be no more improved.

EXAMPLES

Next, the present invention will be explained hereunder by means of the following examples and comparative examples.

Table 1 shows the manufacture conditions in Example 1 to Example 6 of the present invention.

Table 2 shows the manufacture conditions in Comparative Example 1 to Comparative Example 7, which are similar to the method of the present invention but deviate from the conditions of the present invention.

Table 3 shows the manufacture conditions in Comparative Example 8 to Comparative Example 12 which demonstrate the manufacture of conventional coated steel sheets.

In Comparative Example 1, the top coat layer was formed without modifying the surface of the polyolefin resin layer.

In Comparative Example 2, the surface modification of the polyolefin resin layer was effected by corona discharging but the formation of the functional groups thereon was unsatisfactory. In Comparative Example 3, the formation of the functional groups on the polyolefin resin layer was excessive due to the surface modification of the layer.

In Comparative Example 4, the top coat layer was made of a fluorine-containing paint which is not an urethane-curing composition. In Comparative Example 5, the top coat layer was made of a melamine-curing polyester paint.

In Comparative Example 6, the thickness of the resin interlayer is thin and 40 μm. In Comparative Example 7, the content of the rust-inhibiting pigment in the undercoat layer is low and 5%.

Table 4 shows the manufacture conditions of examples of the present invention and comparative examples, in which additives for improving the flame resistance of the samples and additives for improving the anti-bacterial and anti-fungal properties thereof were added to the resin interlayer and the top coat layer, respectively.

In Examples 7 to 11 and Comparative Examples 13 to 15 in Table 4, all the conditions were the same with respect to the kind of the metal substrate, the thickness of the metal substrate, the chemical treatment, the kind of the undercoat composition, the thickness of the undercoat layer, the temperature at which the undercoat layer was dried and the time for drying the undercoat layer, but the conditions for the step of forming the resin interlayer and the successive steps were varied to those indicated in Table 4.

Precisely, the same conditions were such that a zinc-plated steel substrate having a thickness of 0.8 mm was coated with a chromate coating composition, and then a undercoat composition of an epoxy resin containing 30% of a rust-inhibiting pigment was coated thereover at a thickness of 4μ and dried at 200° C. for 60 seconds.

Table 5 shows the results of the test for evaluating the adhesiveness between the polyolefin resin layer and the top coat layer in the samples of Example 1 to Example 6, Example 9, Example 10, and Comparative Example 1 to Comparative Example 5.

The adhesiveness was determined by a cross-cut tape-peeling test according to JIS K5400 and represented by the number of the squares remained without being peeled, per 100 squares tested.

To evaluate the secondary adhesiveness of each sample, the samples were tested in the manner as mentioned below. The test results are shown also in Table 5. Precisely, each sample was subjected to a cycle test of 10 cycles, in which one cycle comprised dipping in boiling water for 24 hours, then drying in air for 24 hours, then subjecting to the cross-cut tape-peeling test, then dipping in water at 60° C. for 20 days, then drying in air for 24 hours, then subjecting to the cross-cut tape-peeling test, then keeping at −20° C. for 8 hours and then keeping at 60° C. for 16 hours, in this order. After the cycle test, each sample was subjected to the cross-cut tape-peeling test, then kept at a temperature of 50° C. and a humidity of 98% or more for 2000 hours, then dried in air for 24 hours, and then subjected to the final cross-cut tape-peeling test.

Table 6 shows the results of the tests for evaluating various film properties of the samples of Example 1 to Example 6, Example 9, Example 10, Comparative Example 6, Comparative Example 7, and Comparative Examples 8 to 12 for the prior art.

The corrosion resistance was determined by a salt spraying test according to JIS Z2700, in which salt spraying was effected for 3000 hours. Before the test, each sample was treated in the manner mentioned below to make a 0T-bent area and a scratched area. After the test, the flat area, the 0T-bent area and the scratched area in each sample were checked as to whether or not they were corroded.

(1) Using a vise, each sample was bent to form a 0T-bent area.

(2) A zinc-iron plate was cut with shears, and the surface of each sample was rubbed with the rough edge (burr) of the thus-cut plate, by which the surface was scratched.

The weather resistance was determined by a sun shine weather meter test according to JIS K5400, in which each sample was exposed for 3000 hours. After thus exposed, the color difference between the sample and the standard sheet and the percentage of the gloss retention of the surface of each sample were measured.

The formability was determined by a bending test for adhesiveness and a Du Pont impact strength test.

The samples shown in Table 7, each containing flame retardants, were tested by a firing test according to JIS A1321, and the test results are shown in the same table.

The sample of Comparative Example 13 contained no flame retardant. The sample of Comparative Example 14 contained flame retardants in both the resin interlayer and the top coat layer but their amounts were not sufficient.

The samples shown in Table 8, each containing an anti-bacterial and anti-fungal agent in the top coat layer, were tested with respect to their anti-bacterial and anti-fungal properties. The test results are shown in the same table.

Precisely, to determine the anti-bacterial property of each sample, a liquid containing *Escherichia coli* (hereinafter referred to as "bacteria") and a liquid containing *Staphylococcus aureus* (hereinafter referred to as "bacteria") was dropped onto each sample, which was then kept at 25° C. for 24 hours. Then, the number of the living bacteria on each sample was counted. The number of the bacteria before the test was $5\times10^5$.

To determine the anti-fungal property of each sample, the number of the living bacteria on each sample that had been treated and kept for 7 days in the same manner as above was counted. The sample of Comparative Example 13 contained no anti-bacterial and anti-fungal agent. The sample of Comparative Example 15 contained an anti-bacterial and anti-fungal agent in the top coat layer but its amount was not sufficient.

TABLE 1 (1)

Manufacture Conditions in Examples of the Invention

| | Metal Substrate | | | Composition for undercoat Layer | | | | |
|---|---|---|---|---|---|---|---|---|
| Example | Kind | Thickness (mm) | Chemical Treatment | Kind (content of rust-inhibiting pigment) | Thickness (μ) | Drying Temperature (°C.) | Drying Time (sec) | Resin Interlayer |
| 1 | zinc-plated Steel sheet | 0.27 | zinc phosphate, sprayed | epoxy (20%) | 5 | 200 | 40 | adhesive layer polyolefin layer |
| 2 | 5% Al/Zn alloy-plated steel sheet | 0.80 | chromate, coated | urethane-modified epoxy (15%) | 7 | 190 | 60 | adhesive layer polyolefin layer |
| 3 | 5% Al/Zn alloy-plated steel sheet | 0.35 | chromate, coated | epoxy (25%) | 4 | 210 | 40 | adhesive layer polyolefin layer |
| 4 | 55% Al/Zn alloy-plated steel sheet | 0.40 | chromate, coated | epoxy (35%) | 20 | 200 | 50 | adhesive layer polyolefin layer |
| 5 | aluminum sheet | 0.60 | chromate, coated | urethane-modified epoxy (30%) | 2 | 190 | 50 | adhesive layer polyolefin layer |
| 6 | stainless steel sheet | 0.60 | chromate, coated | epoxy (10%) | 3 | 210 | 50 | adhesive layer polyolefin layer |

TABLE 1(2)

Manufacture Conditions in Examples of the Invention

| | Resin Interlayer | | | Surface Modification | | Coating Composition for Top Coat Layer | | | |
|---|---|---|---|---|---|---|---|---|---|
| Example | Kind | Thickness (μ) | Coating Method | Kind | O/C Value | Kind (color) | Thickness (μ) | Drying Temperature (°C.) | Drying Time (sec) |
| 1 | modified polyethylene<br>polyethylene | 5<br>80 | direct co-extrusion through T-die | flame treatment | 0.12 | urethane-curing polyester (green) | 12 | 230 | 50 |
| 2 | modified polyethylene<br>polypropylene | 5<br>50 | lamination of two-layered film | corona discharging treatment | 0.18 | urethane-curing fluorine resin (blue) | 25 | 210 | 70 |
| 3 | modified polyethylene<br>mixture of polyethylene and polypropylene | 10<br>150 | direct co-extrusion through T-die | flame treatment | 0.25 | urethane-curing polyester (beige) | 20 | 230 | 50 |
| 4 | modified polyethylene<br>polyethylene | 30<br>130 | direct co-extrusion through T-die | flame treatment | 0.07 | urethane-curing polyester (gray) | 18 | 220 | 60 |
| 5 | modified polyethylene<br>polypropylene | 15<br>280 | lamination of two-layered film | corona discharging treatment | 0.10 | urethane-curing fluorine resin (cream) | 18 | 220 | 60 |

TABLE 1(2)-continued

Manufacture Conditions in Examples of the Invention

| | Resin Interlayer | | | Surface Modification | | Coating Composition for Top Coat Layer | | | |
|---|---|---|---|---|---|---|---|---|---|
| Example | Kind | Thickness (μ) | Coating Method | Kind | O/C Value | Kind (color) | Thickness (μ) | Drying Temperature (°C.) | Drying Time (sec) |
| 6 | modified polyethylene<br>mixture of polyethylene and polypropylene | 20<br>180 | direct co-extrusion through T-die | flame treatment | 0.28 | urethane-curing fluorine resin (brown) | 22 | 220 | 60 |

TABLE 2 (1)

Manufacture Conditions in Comparative Examples

| | Metal Substrate | | | Composition for undercoat Layer | | | | |
|---|---|---|---|---|---|---|---|---|
| Comparative Example | Kind | Thickness (mm) | Chemical Treatment | Kind (content of rust-inhibiting pigment) | Thickness (μ) | Drying Temperature (°C.) | Drying Time (sec) | Resin Interlayer |
| 1 | zinc-plated steel sheet | 0.50 | zinc phosphate, sprayed | epoxy (28%) | 8 | 200 | 40 | adhesive layer polyolefin layer |
| 2 | 5% Al/Zn alloy-plated steel sheet | 0.80 | chromate, coated | urethane-modified epoxy (25%) | 18 | 190 | 60 | adhesive layer polyolefin layer |
| 3 | 5% Al/Zn alloy-plated steel sheet | 0.60 | chromate, coated | epoxy (28%) | 7 | 190 | 50 | adhesive layer polyolefin layer |
| 4 | aluminum sheet | 0.60 | chromate, coated | epoxy (12%) | 5 | 190 | 50 | adhesive layer polyolefin layer |
| 5 | 5% Al/Zn alloy-plated steel sheet | 0.80 | chromate, coated | urethane-modified epoxy (35%) | 10 | 190 | 60 | adhesive layer polyolefin layer |
| 6 | zinc-plated steel sheet | 0.35 | zinc phosphate, sprayed | epoxy (30%) | 3 | 200 | 40 | adhesive layer polyolefin layer |
| 7 | 5% Al/Zn alloy-plated steel sheet | 0.80 | chromate, coated | urethane-modified epoxy (5%) | 5 | 190 | 60 | adhesive layer polyolefin layer |

*: outside the scope of the present invention.

TABLE 2(2)

Manufacture Conditions in Comparative Examples

| | Resin Interlayer | | | Surface Modification | | Coating Composition for Top Coat Layer | | | |
|---|---|---|---|---|---|---|---|---|---|
| Comparative Example | Kind | Thickness (μ) | Coating Method | Kind | O/C Value | Kind (color) | Thickness (μ) | Drying Temperature (°C.) | Drying Time (sec) |
| 1 | modified polyethylene<br>polyethylene | 10<br>100 | direct co-extrusion through T-die | not surface-modified* | 0.01 | urethane-curing polyester (ivory) | 20 | 230 | 50 |
| 2 | modified polyethylene<br>polypropylene | 8<br>250 | lamination of two-layered film | corona discharging treatment | 0.04* | urethane-curing polyester (gray) | 15 | 230 | 70 |
| 3 | modified polyethylene<br>polyethylene | 30<br>150 | direct co-extrusion through T-die | flame treatment | 0.04* | urethane-curing polyester (brown) | 18 | 220 | 60 |

TABLE 2(2)-continued

Manufacture Conditions in Comparative Examples

| Comparative Example | Resin Interlayer Kind | Thickness (μ) | Coating Method | Surface Modification Kind | O/C Value | Coating Composition for Top Coat Layer Kind (color) | Thickness (μ) | Drying Temperature (°C.) | Drying Time (sec) |
|---|---|---|---|---|---|---|---|---|---|
| 4 | modified polyethylene<br>polyethylene | 10<br>150 | direct co-extrusion through T-die | flame treatment | 0.25 | thermoplastic acrylic-modified fluorine resin* (green) | 22 | 250 | 60 |
| 5 | modified polyethylene<br>polypropylene | 15<br>250 | lamination of two-layered film | corona discharging treatment | 0.18 | melamine-curing polyester* (blue) | 15 | 230 | 70 |
| 6 | modified polyethylene<br>polyethylene | 10<br>30* | direct co-extrusion through T-die | flame treatment | 0.25 | urethane-curing fluorine resin (white) | 15 | 210 | 50 |
| 7 | modified polyethylene<br>polypropylene | 15<br>90 | lamination of two-layered film | corona discharging treatment | 0.18 | urethane-curing polyester (beige) | 15 | 230 | 70 |

*: outside the scope of the present invention.

TABLE 3(1)

Manufacture Condition for Conventional Coated Steel Sheets

| Comparative Example | Metal Substrate Kind | Thickness (mm) | Chemical Treatment | Composition for undercoat Layer Kind (content of rust-inhibitng pigment) | Thickness (μ) | Drying Temperature (°C.) | Drying Time (sec) |
|---|---|---|---|---|---|---|---|
| 8 | zinc-plated steel sheet | 0.35 | zinc phosphate, sprayed | epoxy (35%) | 5 | 200 | 30 |
| 9 | 5% Al/Zn alloy-plated steel sheet | 0.60 | chromate, coated | epoxy (20%) | 7 | 190 | 50 |
| 10 | 55% Al/Zn alloy-plated steel sheet | 0.50 | chromate, coated | epoxy (40%) | 5 | 200 | 50 |
| 11 | zinc-plated steel sheet | 0.40 | zinc phosphate, sprayed | epoxy-modified acryl (28%) | 4 | 180 | 60 |
| 12 | 5% Al/Zn alloy-plated steel sheet | 0.40 | chromate, coated | epoxy (30%) | 5 | 200 | 50 |

TABLE 3(2)

Manufacture Conditions for Conventional Coated Steel Sheets

| Comparative Example | Adhesive Kind (coating system) | Thickness (μ) | Coating Paint for Top Coat Layer Kind (color) | Coating Method | Thickness (μ) | Drying Tempera-ture (°C.) | Drying Time (sec) |
|---|---|---|---|---|---|---|---|
| 8 | | | melamine-curing polyester | roll coater | 12 | 220 | 40 |

TABLE 3(2)-continued

Manufacture Conditions for Conventional Coated Steel Sheets

| | Adhesive | | Coating Paint for Top Coat Layer | | | | |
|---|---|---|---|---|---|---|---|
| Comparative Example | Kind (coating system) | Thickness (μ) | Kind (color) | Coating Method | Thickness (μ) | Drying Tempera-ture (°C.) | Drying Time (sec) |
| 9 | | | (green) vinylidene fluoride-based fluorine resin | roll coater | 20 | 245 | 60 |
| 10 | | | (gray) vinylidene fluoride-based fluorine resin | roll coater | 22 | 245 | 60 |
| 11 | | | (cream) polyvinyl chloride sol | roll coater | 180 | 220 | 80 |
| 12 | urethane (roll coater) | 15 | (blue) polyvinyl chloride film (brown) | film lamination | 150 | 200 | 60 |

TABLE 4(1)

Manufacture Conditions for Additive-Containing Samples

| | Resin Interlayer | | | | |
|---|---|---|---|---|---|
| Example | Section | Kind | Kind and Amount of Additive, if any | Thickness (μ) | Coating Method |
| 7 | adhesive layer<br>polyolefin layer | modified polyethylene<br>polyethylene | antimony trioxide (8%) +<br>tetrabromobisphenol A (12%) | 8<br>110 | direct co-extrusion through T-die |
| 8 | adhesive layer<br>polyolefin layer | modified polyethylene<br>polypropylene | antimony trioxide (5%) +<br>decabromobisphenyl ether (8%) | 12<br>120 | lamination of two-layered film |
| 9 | adhesive layer<br>polyolefin layer | modified polyethylene<br>polypropylene | antimony trioxide (9%) +<br>tetrabromobisphenol A (6%) | 15<br>130 | lamination of two-layered film |
| 10 | adhesive layer<br>polyolefin layer | modified polyethylene<br>mixture of polyethylene and polypropylene | none | 10<br>150 | direct co-extrusion through T-die |
| 11 | adhesive layer<br>polyolefin layer | modified polyethylene<br>polyethylene | none | 25<br>200 | direct co-extrusion through T-die |

TABLE 4(2)

Manufacture Conditions for Additive-Containing Samples

| | Surface Modification | | Coating Paint for Top Coat Layer | | | | |
|---|---|---|---|---|---|---|---|
| Example | Kind | O/C Value | Kind (color) | Kind and Amount of Additive, if any | Thickness (μ) | Drying Temperature (°C.) | Drying Time (sec) |
| 7 | flame treatment | 0.15 | urethane-curing polyester (brown) | none | 15 | 230 | 70 |
| 8 | corona discharging treatment | 0.07 | urethane-curing polyester (beige) | antimony trioxide (7%) + decabromobisphenyl ether (7%) | 18 | 230 | 70 |
| 9 | corona | 0.18 | urethane-curing fluorine | antimony trioxide (14%) + | 20 | 210 | 70 |

TABLE 4(2)-continued

| | Manufacture Conditions for Additive-Containing Samples | | | | | | |
|---|---|---|---|---|---|---|---|
| | Surface Modification | | Coating Paint for Top Coat Layer | | | | |
| Example | Kind | O/C Value | Kind (color) | Kind and Amount of Additive, if any | Thickness (μ) | Drying Temperature (°C.) | Drying Time (sec) |
| | discharging treatment | | resin (blue) | tetrabromobisphenol A (12%) | | | |
| 10 | flame treatment | 0.25 | urthane-curing polyester (gray) | Clean P-2-D (produced by Nichihan Laboratories Co.) (0.1%) | 20 | 230 | 70 |
| 11 | flame treatment | 0.28 | urethane-curing fluorine resin (blue) | Apacider A (produced by Sangi Co.) (1.5%) | 18 | 220 | 70 |

TABLE 4(3)

| | Manufacture Conditions for Additive-Containing Samples | | | | |
|---|---|---|---|---|---|
| | Resin Interlayer | | | | |
| Comparative Example | Section | Kind | Kind and Amount of Additive, if any | Thickness (μ) | Coating Method |
| 13 | adhesive layer<br>polyolefin layer | modified polyethylene<br>polyethylene | none | 10<br>140 | direct co-extrusion through T-die |
| 14 | adhesive layer<br>polyolefin layer | modified polyethylene<br>polypropylene | antimony trioxide (2%) + tetrabromobisphenol A (1%) | 8<br>120 | lamination of two layered film |
| 15 | adhesive layer<br>polyolefin layer | modified polyethylene<br>polyethylene | | 10<br>180 | direct co-extrusion through T-die |

TABLE 4(4)

| | Manufacture Conditions for Additive-Containing Samples | | | | | | |
|---|---|---|---|---|---|---|---|
| | Surface Modification | | Coating Paint for Top Coat Layer | | | | |
| Comparative Example | Kind | O/C Value | Kind (color) | Kind and Amount of Additive, if any | Thickness (μ) | Drying Temperature (°C.) | Drying Time (sec) |
| 13 | flame treatment | 0.11 | urethane-curing polyester (ivory) | none | 12 | 230 | 70 |
| 14 | corona discharging treatment | 0.22 | urethane-curing polyester (brown) | antimony trioxide (2%) + decabromobisphenyl ether (2%) | 15 | 230 | 70 |
| 15 | corona discharging treatment | 0.08 | urethane-curing polyester (ivory) | zeolite-silver (0.03%) | 20 | 230 | 70 |

TABLE 5(1)

| Example | O/C Value after Surface Modification | Kind of Top Coat Film | Evaluation of Adhesiveness: Primary Adhesiveness | Secondary Adhesiveness: dipped in boiling water for 24 hours | Secondary Adhesiveness: dipped in hot water for 20 days | Secondary Adhesiveness: after 10 cold-hot cycles | Secondary Adhesiveness: wetting test for 2000 hours |
|---|---|---|---|---|---|---|---|
| 1 | 0.12 | urethane-curing polyester | 100/100 | 100/100 | 100/100 | 100/100 | 100/100 |
| 2 | 0.18 | urethane-curing fluorine resin | 100/100 | 100/100 | 100/100 | 100/100 | 100/100 |
| 3 | 0.25 | urethane-curing polyester | 100/100 | 100/100 | 100/100 | 100/100 | 100/100 |
| 4 | 0.07 | urethane-curing polyester | 100/100 | 100/100 | 100/100 | 100/100 | 100/100 |
| 5 | 0.10 | urethane-curing fluorine resin | 100/100 | 100/100 | 100/100 | 100/100 | 100/100 |
| 6 | 0.28 | urethane-curing fluorine resin | 100/100 | 100/100 | 100/100 | 100/100 | 100/100 |
| 9 | 0.18 | urethane-curing fluorine resin | 100/100 | 100/100 | 100/100 | 100/100 | 100/100 |
| 10 | 0.25 | urethane-curing polyester | 100/100 | 100/100 | 100/100 | 100/100 | 100/100 |

TABLE 5(2)

| Comparative Example | O/C Value after Surface Modification | Kind of Top Coat Film | Evaluation of Adhesiveness: Primary Adhesiveness | Secondary Adhesiveness: dipped in boiling water for 24 hours | Secondary Adhesiveness: dipped in hot water for 20 days | Secondary Adhesiveness: after 10 cold-hot cycles | Secondary Adhesiveness: wetting test for 2000 hours |
|---|---|---|---|---|---|---|---|
| 1 | 0.01 | urethane-curing polyester | 0/100 | 0/100 | 0/100 | 0/100 | 0/100 |
| 2 | 0.04 | urethane-curing polyester | 100/100 | 12/100 | 80/100 | 40/100 | 18/100 |
| 3 | 0.40 | urethane-curing polyester | 100/100 | 36/100 | 88/100 | 96/100 | 22/100 |
| 4 | 0.25 | thermoplastic acryl-modified fluorine resin | 100/100 | 12/100 | 70/100 | 40/100 | 32/100 |
| 5 | 0.18 | melamine-curing polyester | 100/100 | 80/100 | 92/100 | 80/100 | 60/100 |

TABLE 6

Evaluation of Various Properties of Film

| | Color | Corrosion Resistance: flat area | Corrosion Resistance: OT-bent area | Corrosion Resistance: scratched area | Weather Resistance: color difference (ΔE) | Weather Resistance: percentage of gloss retention | Machinability: OT bending | Machinability: DuPont |
|---|---|---|---|---|---|---|---|---|
| Example 1 | green | good | good | good | 3.8 | 68% | good | good |
| Example 2 | blue | good | good | good | 2.0 | 83% | slightly cracked | good |
| Example 3 | beige | good | good | good | 4.5 | 77% | good | good |
| Example 4 | gray | good | good | good | 3.9 | 64% | good | good |
| Example 5 | cream | good | good | good | 1.6 | 90% | good | good |
| Example 6 | brown | good | good | good | 1.8 | 85% | good | good |
| Example 9 | blue | good | good | good | 2.2 | 88% | good | good |
| Example 10 | gray | good | good | good | 3.0 | 67% | good | good |
| Comparative Example 6 | cream | good | good | white rust 40% | 1.9 | 84% | good | good |
| Comparative Example 7 | blue | good | good | white rust 10% | 3.6 | 60% | good | good |
| Comparative Example 8 | green | white rust 60% | white rust 100% | white rust 100% | 11.5 | 15% | greatly cracked | greatly cracked |
| Comparative Example 9 | gray | slightly swollen | white rust 40% | white rust 60% | 1.4 | 88% | lightly cracked | good |
| Comparative Example 10 | cream | slightly swollen | white rust 20% | white rust 40% | 1.8 | 86% | slightly cracked | good |
| Comparative | blue | good | lightly swollen | good | 10.4 | 10% | good | good |

TABLE 6-continued

Evaluation of Various Properties of Film

| | Color | Corrosion Resistance: flat area | Corrosion Resistance: OT-bent area | Corrosion Resistance: scratched area | Weather Resistance: color difference (ΔE) | Weather Resistance: percentage of gloss retention | Machinability: OT bending | Machinability: DuPont |
|---|---|---|---|---|---|---|---|---|
| Example 11 | | | | | | | | |
| Comparative Example 12 | brown | good | slightly swollen | good | 12.9 | 6% | good | good |

TABLE 7

Results of Tests for Evaluating Flame Resistance of Flame Retardant-Containing Samples

| | Incorporation of Flame Retardant: Amount of Flame Retardant in Resin Interlayer | | Amount of Flame Retardant in Top Coat Layer | | Results of Firing Test | | |
|---|---|---|---|---|---|---|---|
| | Antimony Trioxide | Bromine-containing Flame Retardant | Antimony Trioxide | Bromine-containing Flame Retardant | Flame Factor (CA) | Exhaust Temperature (tδΘ) | After Flame Time (sec) |
| Example 7 | 8% | 12% | 0% | 0% | 10 | 0 | 15 |
| Example 8 | 5% | 8% | 7% | 7% | 8 | 0 | 0 |
| Example 9 | 9% | 6% | 14% | 12% | 3 | 0 | 0 |
| Comparative Example 13 | 0%* | 0%* | 0% | 0% | 23 | 80 | 120 |
| Comparative Example 14 | 2% | 1% | 2% | 2% | 20 | 45 | 37 |

*: outside the scope of the present invention

TABLE 8

Results of Tests for Anti-bacterial and Anti-fungal Properties of Samples Containing Anti-bacterial Anti-fungal Agent

| | Amount of Anti-bacterial and Anti-fungal Agent in Top Coat Layer | Results of Anti-bacterial Test: *Escherichia coli* | Results of Anti-bacterial Test: *Staphylococcus aureus* | Results of Anti-fungal Test: black mold | Results of Anti-fungal Test: blue mold |
|---|---|---|---|---|---|
| Example 10 | 0.1% | not detected | not detected | not more than 10 | not more than 10 |
| Example 11 | 1.5% | not detected | not detected | not more than 10 | not more than 10 |
| Comparative Example 13 | 0%* | $3 \times 10^5$ | $2 \times 10^5$ | much grown | much grown |
| Comparative Example 15 | 0.03%* | $1 \times 10^4$ | $2 \times 10^4$ | $3 \times 10^3$ | $6 \times 10^2$ |

*: outside the scope of the present invention

As mentioned hereinabove, since the composite metal sheet of the present invention has a top coat layer made of an urethane-curing polyester resin composition or an urethane-curing fluorine-containing resin composition on the interlayer made of a polyolefin resin composition, it has extremely excellent corrosion resistance due to the intrinsic characteristics of the polyolefin resin of being resistant to water penetration and moisture penetration.

Although the polyolefin resins in the interlayer have a drawback in that they are deteriorated by ultraviolet rays, the top coat layer may protect the interlayer from ultraviolet rays. In addition, the top coat layer has excellent weather resistance.

The composite metal sheet of the present invention has much more excellent durability than other coated metal sheets to be obtained by conventional continuous coating methods, continuous laminating methods or continuous hot melt-coating methods.

In addition, when a flame retardant is added to the resin interlayer and the top coat layer of the composite metal sheet of the present invention, thereby improving the flame resistance of the sheet, then it is unnecessary to reduce the thickness of the resin interlayer. In addition, there is no risk of worsening the corrosion resistance of the composite metal sheet even though the sheet is scratched when machined.

Further, when an anti-bacterial and anti-fungal agent is added to the top coat layer, then the composite metal sheet having such excellent weather resistance and corrosion resistance may additionally have excellent anti-bacterial and anti-fungal properties.

What is claimed is:

1. A composite metal sheet having, on the surface of a metal substrate in the following order:

(a) a chemically treated layer formed by chemically treating said metal substrate to improve adhesion by the following layer, (b) an undercoat layer of an organic resin-containing paint thereon, (c) a two-layered resin interlayer with a thickness of from 50 to 300 μm composed of (i) an adhesive layer of a modified polyolefin resin applied on said undercoat layer, and (ii) a polyolefin resin layer, having a surface modified to have functional groups thereon, wherein the amount of oxygen (O) and carbon (C) present in the functional groups have an O/C ratio from 0.05 to 0.30, (d) a top coat layer applied on the surface modified to have functional groups, with a thickness of from 8 to 35 μm made of a urethane-curing polyester resin or a urethane-curing fluorine resin.

2. A method for producing a composite metal sheet comprising steps of:

(a) chemically treating the surface of a metal substrate, (b) coating and drying an organic resin-containing paint thereon to form an undercoat layer, (c) then forming thereon a two-layered resin interlayer composed of (i) an adhesive layer of a modified polyolefin resin applied on said undercoat layer, and (ii) a polyolefin resin layer at a thickness of from 50 to 300 μm, (d) then modifying the surface of said polyolefin resin layer by flame treatment or corona discharging treatment thereby forming functional groups thereon, wherein the amount of oxygen (O) and carbon (C) present in the functional groups have an O/C ratio from 0.05 to 0.30, and (e) finally coating and drying a urethane-curing polyester resin or a urethane-curing fluorine resin at a thickness of from 8 to 35 μm on said modified layer (d) to form a top coat layer.

3. The composite metal sheet as claimed in claim 1, in which the undercoat layer further contains, as a rust-inhibiting pigment, strontium chromate or zinc chromate or a mixture of strontium chromate and zinc chromate in an amount of from 10 to 40 parts by weight based on 100 parts by weight of the resin in the layer.

4. The composite metal sheet as claimed in claim 1, in which the two-layered resin interlayer further contains in each layer, as flame resistance improving agents, antimony trioxide and a bromine-containing flame retardant, in an amount of from 3 to 15 parts by weight each, based on 100 parts by weight of the resin in each layer.

5. The composite metal sheet as claimed in claim 1, in which each layer in the two-layered resin interlayer and the top coat layer further contain, as flame resistance improving agents, antimony trioxide and a bromine-containing flame retardant, in an amount of from 3 to 15 parts by weight each, per 100 parts by weight of the resin in each layer.

6. The composite metal sheet as claimed in claim 1, in which the top coat layer further contains, as an anti-bacterial and anti-fungal agent, a silver-containing, inorganic anti-microbial agent in an amount of from 0.05 to 2 parts by weight based on 100 parts by weight of the resin in the layer.

7. The composite metal sheet as claimed in claim 1, in which the thickness of the two-layered resin interlayer is from 80 to 300 μm.

* * * * *